(12) United States Patent
Fromme et al.

(10) Patent No.: US 10,747,649 B2
(45) Date of Patent: Aug. 18, 2020

(54) METHOD FOR TRANSMITTING METROLOGICALLY ACQUIRED AND DIGITIZED MEASURED DATA AND A SUITABLE TEST DEVICE FOR CARRYING OUT THE METHOD

(71) Applicant: dSPACE digital signal processing and control engineering GmbH, Paderborn (DE)

(72) Inventors: Matthias Fromme, Hoevelhof (DE); Jochen Sauer, Brakel (DE); Matthias Schmitz, Delbrueck (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 255 days.

(21) Appl. No.: 15/996,850

(22) Filed: Jun. 4, 2018

(65) Prior Publication Data
US 2018/0349255 A1    Dec. 6, 2018

(30) Foreign Application Priority Data

Jun. 2, 2017  (DE) .................. 10 2017 112 208

(51) Int. Cl.
| | | |
|---|---|---|
| *G06F 11/36* | (2006.01) | |
| *G06F 9/48* | (2006.01) | |
| *G06F 11/22* | (2006.01) | |

(52) U.S. Cl.
CPC ........ *G06F 11/3664* (2013.01); *G06F 9/4881* (2013.01); *G06F 11/22* (2013.01)

(58) Field of Classification Search
CPC ..... G06F 9/4881; G06F 11/3664; G06F 11/22
(Continued)

(56) References Cited

U.S. PATENT DOCUMENTS 5,905,727 A     5/1999  Christensen et al.
6,631,433 B1 *  10/2003  Paluzzi .................. G06F 13/364
                                          710/113
(Continued)

FOREIGN PATENT DOCUMENTS

| EP | 3 015 992 B1 | 3/2017 |
|---|---|---|
| EP | 3 015 995 B1 | 3/2017 |
| WO | WO 2014/090448 A1 | 6/2014 |

OTHER PUBLICATIONS

German Search Report for German Application No. 10 2017 112 208.7 dated Mar. 16, 2018 with English translation.
(Continued)

*Primary Examiner* — John Q Chavis
(74) *Attorney, Agent, or Firm* — Muncy, Geissler, Olds & Lowe, P.C.

(57) ABSTRACT

A method and device for transmitting metrologically acquired and digitized measured data in a test device. The measured data corresponds to a program task, and a direction of the transmission of the measured data from a measured data transmitter of the test device is provided via a data channel to a measured data receiver of the test device. The measured data transmitter has a signal preprocessing processor, a task monitoring processor and a data channel arbiter. Via the task monitoring processor, a task ID data packet is generated at an execution start of the program task or at an execution end of the program task, and the task ID data packet is transmitted to the data channel arbiter. Via the data channel arbiter, the measured data and the task ID data packet are successively forwarded via the data channel as a data stream to the measuring data receiver.

15 Claims, 4 Drawing Sheets

(58) Field of Classification Search
USPC .......................................................... 717/124
See application file for complete search history.

(56) References Cited

U.S. PATENT DOCUMENTS

| | | |
|---|---|---|
| 2005/0007961 A1 | 1/2005 | Scott et al. |
| 2005/0039078 A1 | 2/2005 | Bradley et al. |
| 2015/0082289 A1* | 3/2015 | Leinfellner ............ G05B 17/02 717/134 |
| 2016/0355101 A1 | 11/2016 | Sauer et al. |
| 2016/0355203 A1 | 11/2016 | Sauer et al. |

OTHER PUBLICATIONS

Hering et al., Handbuch der praktischen und technischen Informatik, Springer, pp. 1-16 (2000).
Wikipedia, "Policy-Based Routing" at https://de.wikipedia.org/w/index.php, pp. 1-2 (Nov. 20, 2017).
DSPACE, Scalexio Product Information, pp. 1-60 (Jan. 2017).
DSPACE, MicroAutoBoxII Product Information, pp. 1-24 (Jan. 2017).
Anderson et al., "A Continuous Media I/O Server and Its Synchronization Mechanism," IEEE Computer, pp. 51-57 (Oct. 1991).

* cited by examiner

METHOD FOR TRANSMITTING METROLOGICALLY ACQUIRED AND DIGITIZED MEASURED DATA AND A SUITABLE TEST DEVICE FOR CARRYING OUT THE METHOD

This nonprovisional application claims priority under 35 U.S.C. § 119(a) to German Patent Application No. 10 2017 112 208.7, which was filed in Germany on Jun. 2, 2017, and which is herein incorporated by reference.

BACKGROUND OF THE INVENTION

Field of the Invention

The present invention relates to a method for transmitting metrologically acquired and digitized measured data, and a test device for carrying out the method.

Description of the Background Art

A test device can be understood to be, for example, a circuit arrangement comprising electronic, data processing and electronic components, which is provided and configured for a test of a further controlling and/or regulating, electronic circuit arrangement, or for a test of a controlling and/or regulating computer code.

So that the test device is able to perform the above-mentioned tasks, it is provided that the test device is particularly adapted to carry out a method for transmitting metrologically acquired data, namely, the transmission of measured data.

The measured data to be transmitted in the test device represents quantities of a physical—for example, electrical—variable or quantities of a geometric size or derivatives of one of the mentioned quantities.

From prior art documents, various methods are known with which metrologically acquired and digitized measured data can be transmitted within test devices. For example, methods for data transmission over the standardized CAN bus system have been known for several decades. Selected data transmission techniques, such as the CAN bus or the MOST bus, which are found in motor vehicles, are also used as far as it is useful, for example, in test devices for the testing of vehicle control units or vehicle control devices.

The aforementioned regulation devices are often referred to as control devices, although their range of functions in the system-theoretical sense usually goes beyond the "pure" regulation function and includes control functions.

Test devices can, for example, have hardware equipment, which is in particular configured to carry out development and/or preproduction versions of a control program code or regulation program code on a test basis.

An example of a test device, which is referred to as a "rapid control prototyping" system or, abbreviated, as an RCP system or as an RCP test device, is documented in the document "MicroAutoBox II" of dSPACE GmbH (English product information, January 2017 issue. This document is available, for example, at the following website: www.d-space.com).

An RCP system is often configured as a processor-controlled electronic device, on which a particular state of development of a controlling and/or regulating software is executable for testing purposes.

Another test device, which is used in particular as a "hardware-in-the-loop" system, short HIL system, can be found in the document "SCALEXIO®" by dSPACE GmbH (English product information, January 2017 issue, available for example at the following website: www.dspace.com).

The so-called HIL simulation is an international technical term for a test method, in which an "embedded system", such as a regulation device or a mechatronic module is connected via its inputs and outputs to an adapted counterpart, for example, a verification device operating as an HIL Simulator, which is used to simulate the real environment of the embedded system. Thus, during the embedded system test, at least a portion of the embedded system input signals are provided by the HIL simulator and at least a portion of the embedded system output signals are sent to the HIL simulator.

The temporal behavior of the environment of the system to be tested can be modeled, for example, by means of an executable model code of a so-called controlled system model, which is run on an HIL simulator. If, for example, an HIL simulator is to test an embedded system, in particular a control device (often abbreviated as ECU), then the HIL simulator is configured as an at least partial replica of the real environment of the control device. In this case, the HIL simulator can therefore communicate via its inputs and outputs or bidirectional communication channels with the control device and thus act as an adapted counterpart of the control device.

The HIL simulation usually has to run in real time. In the simulation of the technical-relevant environment of the control device, wherein the simulated environment includes the simulated controlled system, in particular those interactions of the control device that can recur in a later real environment of the control device can be automated and/or modeled in a predefined order. This allows for the new development version of a control software to be tested under the same criteria as the previous version. Thus, it can be demonstrated in detail whether an error has been eliminated or not (re-testing).

The tests on real systems (for example on a brake system or a traction control system of a motor vehicle) can be greatly reduced by means of the tests on the HIL simulator and, in addition, system limits or limits of controllability of the control device and/or the controlled system can be determined without compromising the real system and its users (e.g., automobile and driver).

The HIL simulation is always only a simplification of reality and usually cannot completely replace the test on the real system that generally follows later, for example, the interaction test of the control device with the "real" controlled system of a controlled prototype and/or the interaction test of the control device with a controlled series product.

Often, for the applications described, relatively high precision and speed requirements are placed on the testing devices for the metrological scanning of electrical impulses (voltage or current pulses), the metrological scanning of an electrical pulse sequence or the metrological scanning of a so-called burst signal. In this case, for a meaningful further processing of sampled and digitized measured data within the test device it is it often required that the measured data be transmitted from a measured data transmitter to a measured data receiver with a comparatively short delay. In other words, testing devices of the type described often have the technical requirement that certain measured data be transmitted from a measured data transmitter to a measured data receiver with low latency.

European Patent EP 3 015 992 B1, which corresponds to US 2016/0335101, which is incorporated herein by reference, discloses a method for managing prioritized input data in a computer system, wherein the computer system has a first processor, an interface unit having a first interface processor and a second interface processor, and a first data connection between the first processor and the interface unit. In the method, a first access management unit is arranged to provide certain input data to the first interface processor and the second interface processor upon request and under certain conditions during execution of a computer program.

From the European patent EP 3 015 995 B1, which corresponds to US 2016/0335203, which is incorporated herein by reference, a method for configuring an interface unit of a computer system is known, wherein the computer system comprises a first processor and a first data link between the first processor and the interface unit, and a second processor located on the interface unit, which could be used for signal preprocessing.

For networked computers of a computer network, technical solutions have been created to transmit large amounts of data per unit of time, for example by using so-called data streams and corresponding "streaming protocols". Examples include the DCCP network protocol (DCCP stands for "datagram congestion control protocol") or the SCTP network protocol (SCTP stands for "stream control transmission protocol"). However, such standard protocols are not readily adapted or suitable for use in a test device.

SUMMARY OF THE INVENTION

It is therefore an object of the present invention to provide a method and a device that for sufficiently meeting the increased demands on measured data transmission, for example within a test device further develop the prior art.

According to an exemplary embodiment of the invention, a method is specified which is suitable for the transmission of metrologically acquired and digitized measured data in a test device, wherein the measured data corresponds to an [M]th program task of an executable program code, and wherein a direction of the transmission of the measured data is provided from a measured data transmitter of the test device via a data channel to a data receiver of the test device, and wherein the measured data transmitter has a signal preprocessing CPU, a task monitoring processor and a data channel arbiter, and by means of the signal preprocessing CPU, the measured data applied to its measured data input is integrated into a predefined data packet format and subsequently transmitted to the data channel arbiter, and by means of the task monitoring processor, a task ID data packet is generated at an execution start of the [M]th program task or at an execution end of the [M]th program task, and the task ID data packet is transmitted to the data channel arbiter, and the measured data and the task ID data packet are successively forwarded by means of the data channel arbiter via the data channel as a data stream to the measured data receiver in such a way, that the measured data receiver can determine a mapping of the measured data with the [M]th program task in that the task ID data packet is identified by means of the measured data receiver.

According to an embodiment of the invention, a test device for executing a program code and for transmitting digitized measured data is furthermore proposed, wherein the measured data corresponds to an [M]th program task of an executable program code, and wherein a direction of the transmission of the measured data from a measured data transmitter of the test device is provided via a data channel to a measured data receiver of the test device, and wherein the measured data transmitter has a signal preprocessing processor, a task monitoring processor and a data channel arbiter, and the signal preprocessing processor is set up to integrate the measured data applied to its measured data input into a predefined data packet format and subsequently transmit it to the data channel arbiter, and the task monitoring processor is arranged to generate a task ID data packet at an execution start of the [M]th program task or at an execution end of the [M]th program task and to deliver the task ID data packet to the data channel arbiter, and the data channel arbiter is set up to forward the measured data and the task ID data packet in succession as a data stream via the data channel to the measured data receiver in such a way that the measured data receiver can determine a mapping of the measured data with the [M]th program task by means of an identifier of the task ID data packet.

An advantage of the method according to the invention and of the test device according to the invention is, in particular, that on the one hand via a data stream, a high data transmission rate is ensured by means of the data transmission, but on the other hand, the measured data can be mapped to a program task corresponding to the measured data.

An exact mapping of predefined measured data to a program task corresponding to the measured data is advantageous, for example, for further processing of the measured data, in particular when a control and/or regulating function is performed based on the measured data.

Another advantage of the inventive method and the test device according to the invention is that one/more task ID data packet(s) can be inserted into the data stream with comparatively little effort, which helps to keep the costs for hardware, software and time required for realizing the invention comparatively low. The latter advantage is due to the fact that thanks to the invention, the measured data present in the data packet format need not be changed for task mapping.

If one were to deviate from the invention and, for example, code task information into data packets containing measured data, then the associated increased overhead cost would ultimately have a negative effect on the data throughput for the data transmission from the measured data transmitter to the measured data receiver, i.e., the speed of the data transmission would be reduced, or a more elaborate or more costly workaround solution would have to be realized to achieve sufficient data transmission speed.

The program code can be an amount of information comprising related contents and computing instructions, wherein said information enables a computer unit—for example, a microcontroller—to carry out certain tasks. The program code is usually adapted to a configuration of the computer unit. For example, the program code can exist in the form of an executable binary file, as an interpretable text-based source code or as an executable block diagram of a graphical programming language.

The computer unit can be configured as, for example, a microcontroller or as a microprocessor board or as a computer, wherein the computer unit can have a corresponding input to each measured data receiver output of the measured data receiver, in order to transmit both measured data and the task ID data packets that are mapped to the measured data via a data connection from a measured data receiver output to a corresponding input of the computer unit.

The program task in the context of the present invention can be understood to be a computational process, comprising at least one process step or a plurality of process steps. The program task is mapped to the program code, and in such a way that an execution of the program code includes processing the program task/s mapped to the program code.

A program task can be carried out by means of a microprocessor, for example, on a microprocessor included in a computer unit of the test device. In the context of the program task, "[M]" is any integer. Consequently, an [M+1]st program task is a direct successor of the [M]th program task. The direct successor of the [M+1]st program task is the [M+2]nd program task and so on. In other words, further program tasks with an imaginary successive serial number [M+N] follow the [M]th program task, wherein N is an integer and a positive number that starts with a value N=1, and wherein N is increased with each immediately succeeding program task by the value 1.

The maximum value of N thus depends on a total number of program tasks, and this total number is influenced directly or indirectly by the program code, for example, by means of an abort criterion for a program code execution. For example, the inventive method is further developed such that the measured data corresponds to the [M]th program task in such a way, that all measured data acquired by the first sensor and/or by the second sensor within an execution duration of the [M]th program task is provided for the signal preprocessing processor within the execution duration of the [M]th program task and also forwarded to the measured data receiver via data channel arbiters within the execution duration of the [M]th program task.

The measured data can be transmitted to the computing unit via the measuring data transmitter and via the measured data receiver, and hereinafter, for example, the computer unit outputs computed actuator control data to an actuator by means of the program code which processes the measured data. The actuator can comprise a digital-to-analog converter which converts the actuator control data into a desired electrical current or a desired electrical voltage, for example, for operating an electromagnet or electric motor or other electrical consumer included in the actuator.

In an embodiment of the method according to the invention, by means of the task monitor processor, the task ID data packet can be generated at the same time as an execution start of the [M]th program task or at the same time as an execution end of the [M]th program task, and the task ID data packet is transmitted to the data link arbiter. In the context of the present teaching, "at the same time" does not mean that no delay could be measured with current measurement methods between the "simultaneous" steps, but merely that a delay between the "simultaneous" steps is so low that the delay is negligible for the operational performance, because despite the delay, the measured data receiver can map a task ID data packet error-free to the corresponding measured data. In other words, "at the same time" is interpreted as "having a sufficiently small delay that does not cause mismatching of a task ID data packet to corresponding measured data".

The data channel comprises a physical medium for data forwarding, for example, a copper cable connection, or an optical data transmitter such as a fiber optic cable or a plastic fiber cable. A copper connection cable can be designed, for example, as a twisted shielded copper cable. For the sake of simplicity, when using an optical data transmitter, a converter from an optical to an electrical signal and a converter from an electrical to an optical signal are to be regarded as components of the data channel, and a further explanation hereto can be omitted since the present description is directed at those skilled in the art. The length of the data channel can, for example, be dimensioned such that a measured data transmitter is accommodated in a first area and the measured data receiver is located in a second area of a development lab. The data channel can be designed for serial data transmission, for example as a serial bus.

In the field of digital data transmission, an arbiter is a known technical component for switching a data channel or data transmission path. Because the term arbiter is not always used in the technical literature with the same definition, the term "data channel arbiter" can be used in the context of the present invention to emphasize that the term is used for controlling data transmission. In accordance with pre-defined rules for a multi-subset quantity of digital information supplied to the arbiter via one or more arbiter inputs, the data channel arbiter specifies in what order the individual subsets are delivered to a data receiver, via an output of the arbiter which is connected to the output of the arbiter via a data channel. Data channel arbiters can be realized, for example, as a component of a larger circuit arrangement. A special manifestation of a data channel arbiter is a so-called bus arbiter. In an embodiment of the invention, the data channel arbiter can be configured as a bus arbiter and the data channel as a bus.

By means of the signal preprocessing processor, which is included in the measured data transmitter, the measured data applied to the measured data input of the signal preprocessing processor or to the measured data inputs of the signal preprocessing processor is integrated into a predefined data packet format and subsequently transmitted to the data channel arbiter.

The measured data input can be an interface of the signal preprocessing processor set up to record measured data. The signal preprocessor processor can include two or more measured data inputs. In an exemplary embodiment of the signal preprocessing processor, the latter has an analog-to-digital converter, in order to convert analog measured data supplied via the measured data input by a first sensor into digitized measured data. The digitized measured data is embedded in data packets, and subsequently, the measured data embedded in data packets is forwarded to the data channel arbiter by the signal preprocessing processor.

How much measured data is included per data packet depends on the configuration of the packet-forming algorithms realized on the signal preprocessing processor. The amount of measured data per data packet which is forwarded can be modified or configured by a user of the test device, for example, by means of a suitable configuration software for the signal preprocessing processor. According to an embodiment of the signal preprocessing processor, this is realized within an FPGA component. In the latter embodiment, for example, a change of the packet-forming algorithms provided on the signal preprocessing processor can be brought about by means of a change in the FPGA configuration. The packet-forming algorithms, for example, running in the signal preprocessing processor determine, for example, how large a payload data field of a data packet and/or how large a so-called header of a data packet is/are as compared to the size of the data packet. The measured data can be written by the signal preprocessing processor into payload data fields of the data packets.

In an embodiment of the invention, a measured data input of the signal preprocessing processor can be connected with a so-called "smart sensor", comprising a sensor processor and a sensor bus interface, wherein the measured data input is set up for connection to the smart sensor compatible with the sensor bus interface.

According to the present teaching, in addition to the signal preprocessing processor, the measured data transmitter can comprise a task monitoring processor and a data channel arbiter. The output of the signal preprocessing processor can be connected to a first input of the data channel arbiter for the transmission of the measured data.

The task monitoring processor is provided and configured to generate at least one task ID data packet at an execution start of the [M]th program task or at an execution end of the [M]th program task. The output of the task monitor processor can be connected to a second input of the data channel arbiter for transmission of the task ID data packet(s). The task monitoring processor can be realized, for example, by means of a specially programmed micro-processor or by means of an application-specific FPGA device. For example, the task monitoring processor includes a task monitoring processor input configured to receive a predefined signal that causes the task monitoring processor to output one or more task ID data packets.

In order for the task monitoring processor to generate at least one task ID data packet at an execution start of the [M]th program task or at an execution end of the [M]th program task, information is available to the task monitoring processor from which the time of the execution start of the [M]th program task or a time of the execution end of the [M]th program task can be derived. The information can be provided, for example, by a calculation within the task monitoring processor, for example, by the system monitoring processor being connected with an electronic time synchronizer, and a predefined time behavior of the program task execution makes it possible to predict or determine an execution start of the [M]th program task or an execution end of the [M]th program task by means of a time synchronization signal provided by the electronic time synchronizer.

If the [M]th program task and the subsequent [M+N]th program task(s) are executed on the computer unit, it is preferable that on the one hand, the electronic time synchronizer connected to the task monitoring processor, and on the other hand, a second electronic time synchronizer connected to the computer unit, are synchronized. Alternatively, it is conceivable that the task monitoring processor and the computer unit are connected to the same electronic time synchronizer, whereby it is also possible to predict or determine an execution start of the [M]th program task or an execution end of the [M]th program task by means of a time synchronization signal provided by the electronic time synchronizer, insofar as a predefined relation exists between the time synchronization signal and an execution start of the [M]th program task or an execution end of the [M]th program task.

Provided that the start or the end of a program task is dependent on an angle information—simulated where appropriate—it is provided according to an embodiment of the invention, that the task monitoring processor is connected to an electronic angle synchronizer which outputs an angle synchronization signal to the task monitoring processor. Also, it can be provided that the computer unit is connected with the electronic angle synchronizer, whereby, for example, identical and continuously updated angle information is made available to the computer unit and the task monitoring processor. Also, for example, in order to use the invention for testing a control device for an internal combustion engine, for example, if the start and/or the duration of a program task depend(s) on a corresponding crankshaft angle of the internal combustion engine.

In an exemplary embodiment of the invention, both the computer unit and the task monitoring processor can have a connection to a so-called angle clock, which cyclically provides information about the current—possibly simulated—crankshaft angle.

In an example of an embodiment of the invention, as an alternative to a time or angular dependency of a task change from the [M]th program task to the [M+1]st program task, a trigger influencer, which is connected to the task monitoring processor, delivers a trigger influencing signal to the task monitoring processor. The trigger influencing signal is used in the last-mentioned embodiment to trigger the task change from the [M]th program task to the [M+1]st program task and so on, up to an [M+N]th task with N>1 as a function of a predefined process parameter available to the test device.

A task monitoring processor input of the task monitoring processor can be connected to a trigger selector. The trigger selection selector is adapted to optionally produce a signal transmission channel for the provision of a task ID data packet that is synchronized with the [M]th program task, either to the computer unit, or to a time synchronizer, or to an electronic angle-synchronizer, or to a trigger influencer. The trigger selector can be a selection switch for different signals which can be supplied to the task monitoring processor to influence an output time of a task ID data packet.

If both measured data and a task ID data packet are simultaneously fed to the data channel arbiter via its inputs, the data channel arbiter can be arranged, with respect to the order, to first forward the task ID data packet and then the measured data to the measured data receiver.

The measured data receiver included in the test device comprises at least one measured data receiver input and at least one measured data receiver output, for example, two or more measured data receiver outputs. Packaged measured data, i.e., measured data contained in one or more data packets, is transmitted to the measured data receiver input of the measured data receiver. In addition, one or more task ID data packets are transmitted to the measured data receiver input. The measured data receiver can determine that the measured data is mapped to the [M]th program task by identifying the task ID data packet by means of the measured data receiver.

For example, the measured data receiver can comprise a component for selectively forwarding the measured data to a plurality of measured data receiver outputs in such a way, that measured data acquired by a first sensor is output to a first data receiver output, and measured data acquired by a second sensor is output to a second measured data receiver. The measured data receiver output can have a so-called FIFO memory. If the measured data receiver has several measured data receiver outputs, all measured data receiver outputs each can have a FIFO memory. The FIFO memory supports forwarding the task ID data packets and the measured data to the computer unit in the order in which the task ID data packets and measured data were supplied to the measured data receiver via the data channel.

The task ID data packet can be generated at an execution start of the [M]th program task or at an execution end of the [M]th program task. The task ID data packet is thereby suitable and also provided for forming an initial marking or an end marking of the measured data mapped to the [M]th program task within the data stream flowing from the data channel arbiter to the measured data receiver. The measured data mapped to an [M]th program task is separated in the data stream from the measured data mapped to the [M+1]st program task by means of the task ID data packet. The measured data mapped to an [M+1]st program task can be separated in the data stream from the measured data mapped to an [M+2]nd program task by means of a further task ID data packet. For example, at least one task ID data packet can be inserted into the data stream comprising the measured data for each change of program task.

The task ID data packet must basically contain no information other than a distinguishing identifier with which the measured data receiver distinguishes a task ID data packet from measured data. In one embodiment of the invention, a task ID data packet has fixed and unchangeable coded information content. The task ID data packet can comprise further data, for example metadata. If in an embodiment of the invention, the data channel is a bus or a data bus with several signal preprocessing processors connected to the bus and/or multiple measured data receivers, then the metadata last-mentioned can have a "sender ID" for identifying the transmitting signal preprocessing processor, and/or a "destination identifier" for identifying a corresponding, measured data receiver.

The measured data can include, for example, measured values of physical variables, which reflect defined states of a first sensor connected to the test device and/or a second sensor and/or a measuring device. Quantities of physical variables can be detected by means of the first sensor and by means of the second sensor, wherein the measured values thus obtained are converted, for example, by the signal preprocessing processor into a data packet format. The first sensor can be connected to a first measured data input of the signal preprocessing processor for forwarding measured values of the first sensor to the first measured data input, and the second sensor is connected to a second measured data input of the signal preprocessing processor for forwarding measured values of the second sensor to the second measured data input.

Alternatively, the measured data can be provided, for example, by a simulation computer in the form of simulated measured data, wherein the simulated measured data is computed, for example, in so-called real time by a simulation computer, and/or the simulated measured data, acquired from an earlier electronic test run, is forwarded to a measured data input of the signal preprocessing processor in a pre-defined time sequence.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
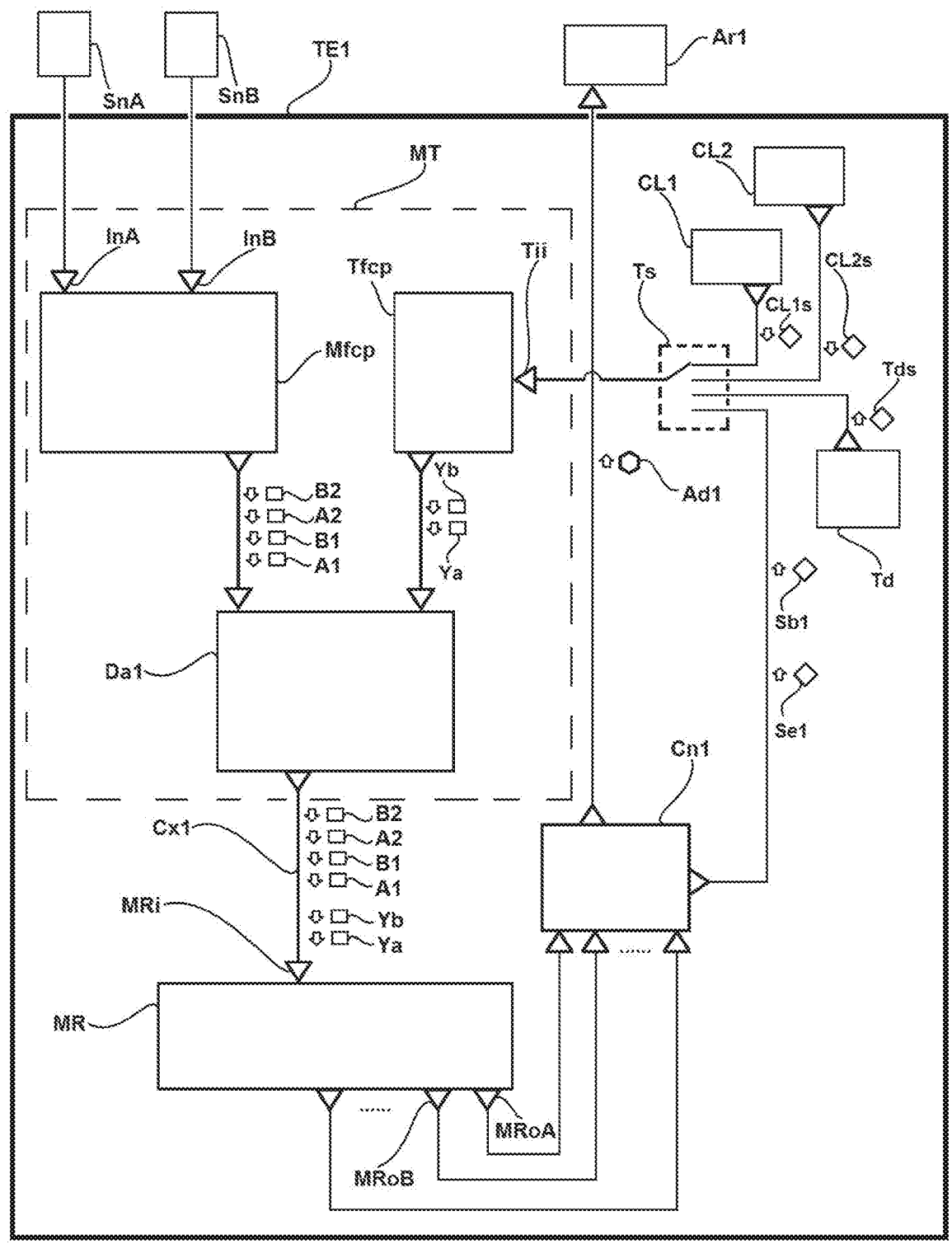
FIG. 1 is a schematic view of an embodiment of a test device according to the invention TE1, wherein a data transmission is shown schematically in a first and second time interval.

In the figures, the inputs are symbolized by triangles which are placed with its triangle tip on an object in the drawing. Outputs are symbolized in the figures by triangles which are placed on an object in the drawing with a triangle edge.

According to an exemplary embodiment of the invention, a method is proposed for transmitting metrologically acquired and digitized measured data A1, A2, B1, B2 in a test device TE1, wherein the measured data A1, A2, B1, B2 corresponds to an [M]th program task of an executable program code, and wherein a direction of the transmission of the measured data A1, A2, B1, B2 is provided from a measured data transmitter MT of the test device TE1 via a data channel Cx1 to a measured data receiver MR of the test device TE1, and wherein the measured data transmitter MT has a signal preprocessing processor Mfcp, a task monitoring processor Tfcp and a data channel arbiter Da1, and by means of the signal preprocessing processor Mfcp, the measured data A1, A2, B1, B2 applied to its measured data input InA, InB is integrated into a predefined data packet format and subsequently transmitted to the data channel arbiter Da1, and by means of the task monitoring processor Tfcp, a task ID data packet Ya, Yb is generated at an execution start of the [M]th program task or at an execution end of the [M]th program task, and the task ID data packet Ya, Yb is transmitted to the data channel arbiter Da1, and the measured data A1, A2, B1, B2 and the task ID data packet Ya, Yb are successively forwarded via data channel Cx1 to the measured data receiver MR as a data stream by means of the data channel arbiter Da1 in such a way, that the measured data receiver MR can determine the mapping of the measured data A1, A2, B1, B2 to the [M]th program task in that the task ID data packet Ya, Yb is identified by the measured data receiver MR.

According to the inventive test device TE1 for executing a program code and for transmitting digitized measured data A1, A2, B1, B2, it is proposed that the measured data A1, A2, B1, B2 correspond to an [M]th program task of an executable program code, and wherein a direction of transmission of the measured data A1, A2, B1, B2 from a measured data transmitter MT of the test device TE1 is provided via a data channel Cx1 to a measured data receiver MR of the test device TE1, and wherein the measured data transmitter MT has a signal preprocessing processor Mfcp, a task monitoring processor Tfcp and a data channel arbiter Da1, and the signal preprocessing processor Mfcp is set up to integrate the measured data A1, A2, B1, B2 applied to its measured data input InA, InB into a predefined data packet format and then to transmit it to the data channel arbiter Da1, and the task monitoring processor Tfcp is adapted to generate a task ID data packet Ya, Yb at an execution start of the [M]th program task or at an execution end of the [M]th program task, and to transmit the task ID data packet Ya, Yb to the data channel arbiter Da1, and the data channel arbiter is set up to successively forward the measured data A1, A2, B1, B2 and the task ID data packet Ya, Yb as a data stream to the measured data receiver MR via data channel Cx1 in such a way, that the measured data receiver MR can determine a mapping of the measured data A1, A2, B1, B2 with the [M]th program task by identifying the task ID data packet Ya, Yb.

The executable program code is executed on a computer unit Cn1 included in the test device TE1 in order to further process the measured data A1, A2, B1, B2, after the measured data A1, A2, B1, B2 has been forwarded from the measured data transmitter MT via the measured data receiver MR to the computer unit Cn1.

The task ID data packet Ya, Yb is essentially simultaneously generated by means of the task monitoring processor TFCP at an execution start of the [M]th program task or substantially simultaneously at an execution end of the [M]th program task, and the task ID data packet Ya, Yb is transmitted to the data channel arbiter Da1.

In real time the computer unit Cn1: in a first case, generates an execution start signal Sb1 with which the execution start of the [M]th program task is detected, wherein the execution start signal Sb1 is transmitted to a task monitoring processor input Tii of the task monitoring processor Tfcp; or in a second case, generates an execution end signal Se1 with which the execution end of the [M]th program task is detected, wherein the execution end signal Se1 is transmitted to a task monitoring processor input Tii of the task monitoring processor Tfcp.

The task ID data packet Ya, Yb is generated essentially simultaneously at the execution start of the [M]th program task by means of the task monitoring processor Tfcp, and further processing of the measured data A1, A2, B1, B2 takes place on the computer unit Cn1 in an [M+1]st program task, immediately following the [M]th program task in time.

The further processing of the measured data A1, A2, B1, B2 takes place in an [M+N]th program task which follows the [M]th program task in time, wherein N is an integer and a positive number with a value greater than one.

The measured data A1, A2, B1, B2 is transmitted from a measured data receiver output MRoA, MRoB of the measured data receiver MR to the computer unit Cn1, and that subsequently, computed actuator control data Ad1 is output to an actuator Ar1 from the computer unit Cn1 by the program code processing the measured data A1, A2, B1, B2.

The data channel arbiter Da1 prioritizes a forwarding of the task ID data packet Ya, Yb to the measured data receiver MR, i.e., the highest possible priority is given with respect to the forwarding. The last-mentioned embodiment offers the advantage that, in the case of a simultaneous transmission of the measured data A1, A2, B1, B2 and the task ID data packet Ya, Yb to the data channel arbiter Da1, there is generally no appreciable delay in the message to be transmitted to the measured data receiver MR and possibly to the computer unit.

Within an execution duration of the [M]th program task, either: the measured data A1, A2, B1, B2 and subsequently the task ID data packet Ya, Yb are transmitted to the measured data receiver MR via the data channel Cx1 by means of the data channel arbiter; or the task ID data packet Ya, Yb and subsequently the measured data A1, A2, B1, B2 are transmitted via the data channel Cx1 to the measured data receiver MR by means of the data channel arbiter.

Originating information for the measured data A1, A2, B1, B2 is acquired in a metadata area of a measured data packet comprising the measured data A1, A2, B1, B2 that corresponds to the data packet format when the former is integrated in the predefined data packet, from which information it is possible to determine whether the measured data was sampled by a first sensor SnA or by a second sensor SnB, and wherein the measured data receiver MR has at least two measured data receiver outputs MRoA, MRoB, namely a first measured data receiver output MRoA and a second measured data receiver output MRoB, and the origination information for an origin-dependent forwarding of the measured data A1, A2, B1, B2 is provided within the measured data receiver MR in such a way, that measured data A1, A2 sampled by the first sensor SnA is output at the first measured data receiver output MRoA, and that measured data B1, B2 sampled by the second sensor SnB is output at the second measured data receiver output MRoA, and wherein numerically, for each measured data input InA, InB read out within an execution duration of the [M]th program task, at least one task ID data packet Ya, Yb is generated, and wherein within the execution duration of the [M]th program task at least one task ID data packet Ya, Yb is output at the first measured data receiver output MRoA and at least one task ID data packet Ya, Yb is output at the second measured data receiver output MRoB.

The method can be carried out in a test device TE1 for performing an HIL simulation or in an RCP test device.

An exemplary embodiment of the inventive test device TE1 is provided and adapted to perform the inventive method or any one of the embodiments or developments of the inventive method.

In the test device TE1, a task monitoring processor input Tii of the task monitoring processor Tfcp is connected to a time synchronizer CL1 in order to transmit a time synchronization signal CL1 s from the time synchronizer CL1 to the task monitoring processor TFCP, wherein the time synchronization signal CL1s has a predefined temporal relationship with a time of a start and/or an end of the [M]th program task and a predefined temporal relationship with a time of a start and/or an end of an [M+N]th program task, wherein N is an integer and N is equal to or greater than 1.

A task monitoring processor input Tii of the task monitoring processor Tfcp is connected to a trigger selector Ts, and the trigger selector Ts is configured to produce a signal transmission channel, either to the computer unit Cn1 or to a time synchronizer CL1 or to an electronic angle synchronizer CL2 or to a trigger influencer Td, for optionally providing delivery of a task ID data packet Ya, Yb which is synchronized with the [M]th program task.

The schematic view of an embodiment of a test device TE1 according to the invention according to FIG. 1 clarifies the data transmission of the measured data A1, A2, B1, B2, in a first and second time interval: In the depicted embodiment of FIG. 1, the first and second time interval lie within the [M]th task.

Within the first time interval, on the one hand, two task ID data packets Ya, Yb are transmitted from the task monitoring processor Tfcp to the data channel arbiter Da1 and on the other hand, measured data A1, A2, B1, B2 is sent from the signal preprocessing processor Mfcp to the data channel arbiter Da1. Since in the illustrated exemplary embodiment, the data channel arbiter Da1 treats a transmission of the task ID data packets Ya, Yb realized as a data stream to the measured data receiver MR with a higher priority than a transmission of the measured data A1, A2, B1, B2 realized in the data stream to the measured data receiver MR, it is ensured that within the data stream, first information about a running [M]th task reaches the measured data receiver MR and subsequently the measured data A1, A2, B1, B2.

Figure 2:
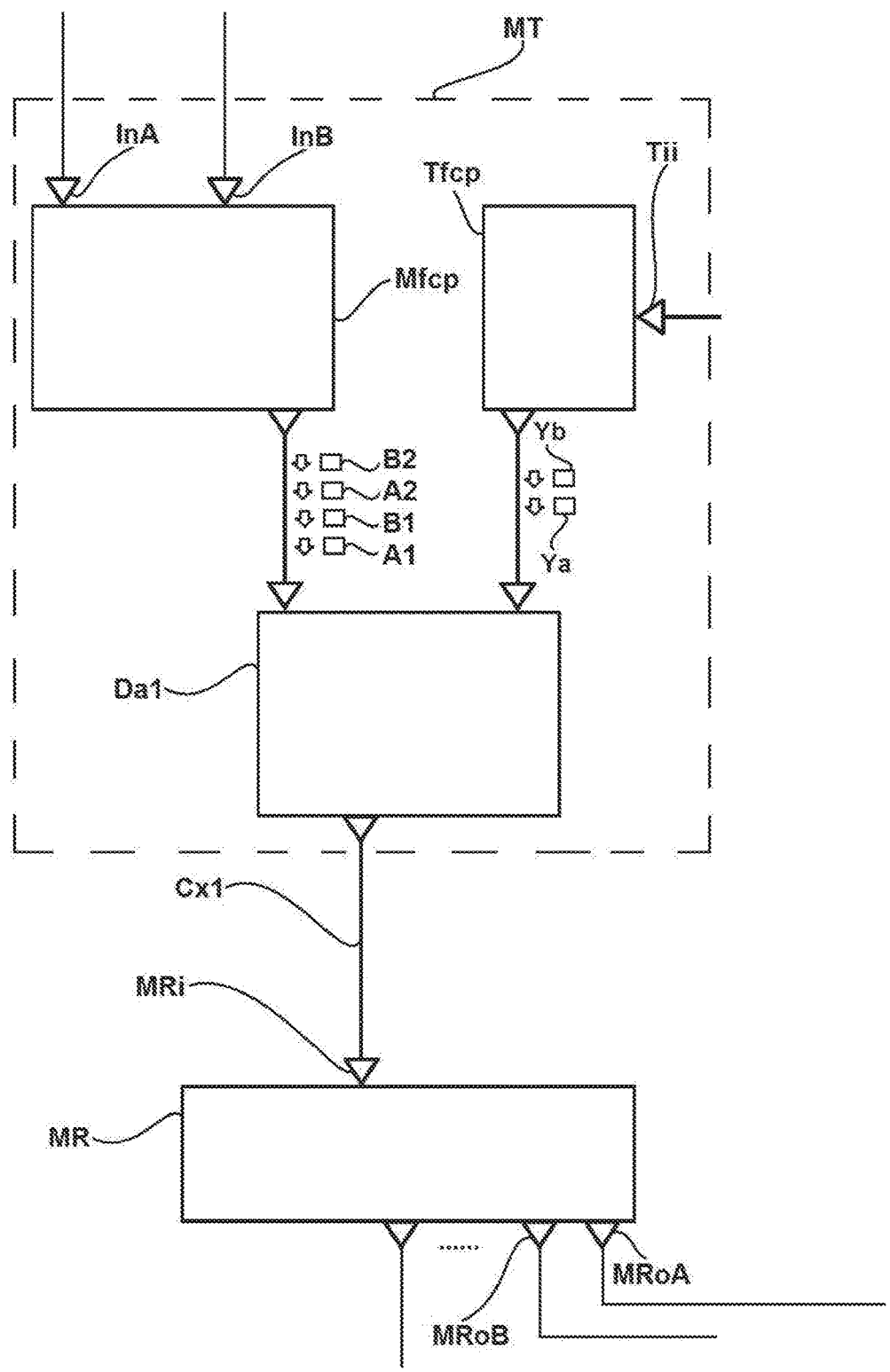
FIG. 2 is a section from FIG. 1, namely a part of the embodiment of the test device TE1 shown in FIG. 1, wherein a data transmission is shown schematically in a first time interval.
Figure 3:
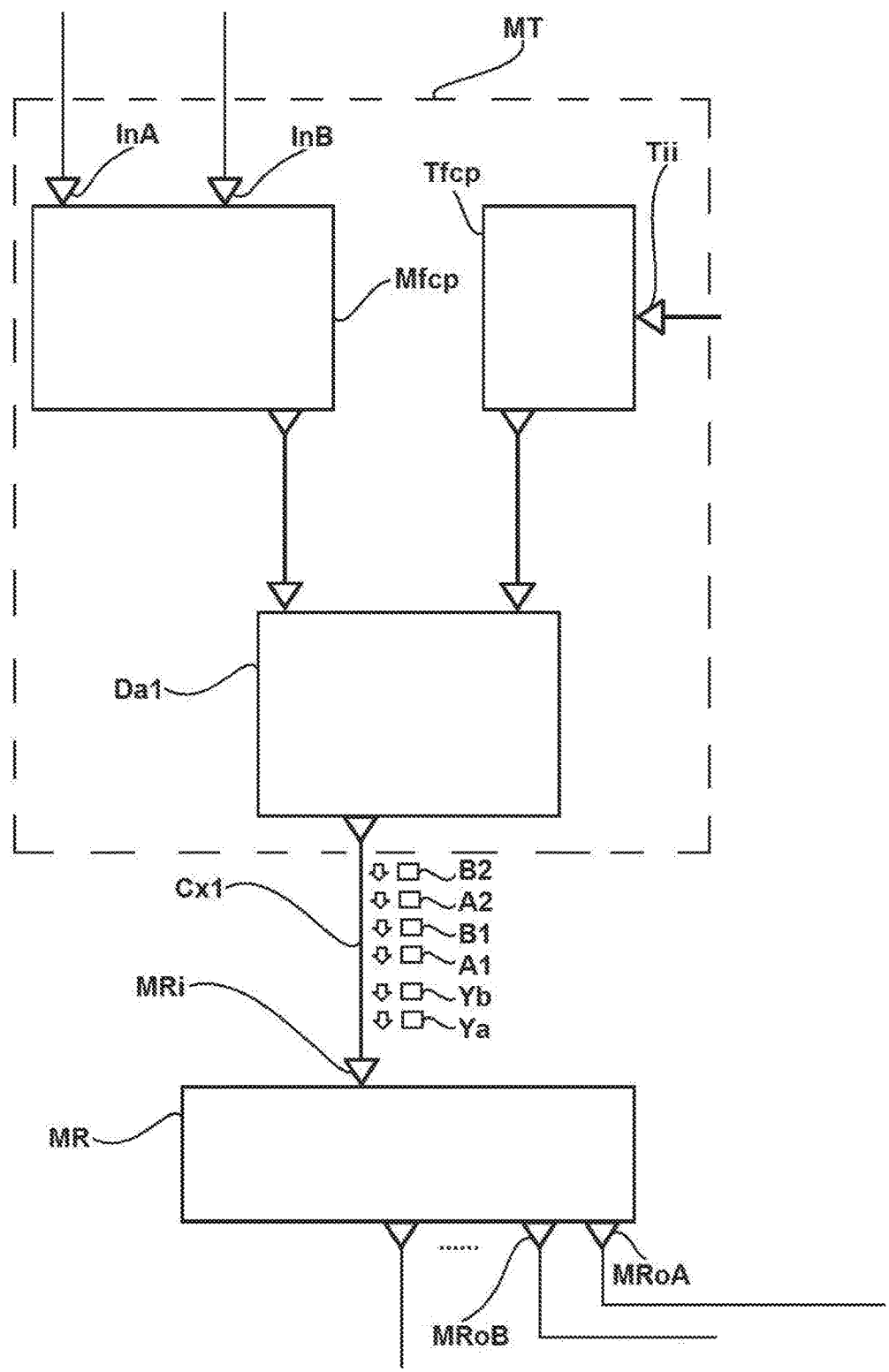
FIG. 3 is a section from FIG. 1, namely a part of the embodiment of the test device TE1 shown in FIG. 1, wherein a data transmission is shown schematically in a second time interval, which follows the first time interval.
Figure 4:
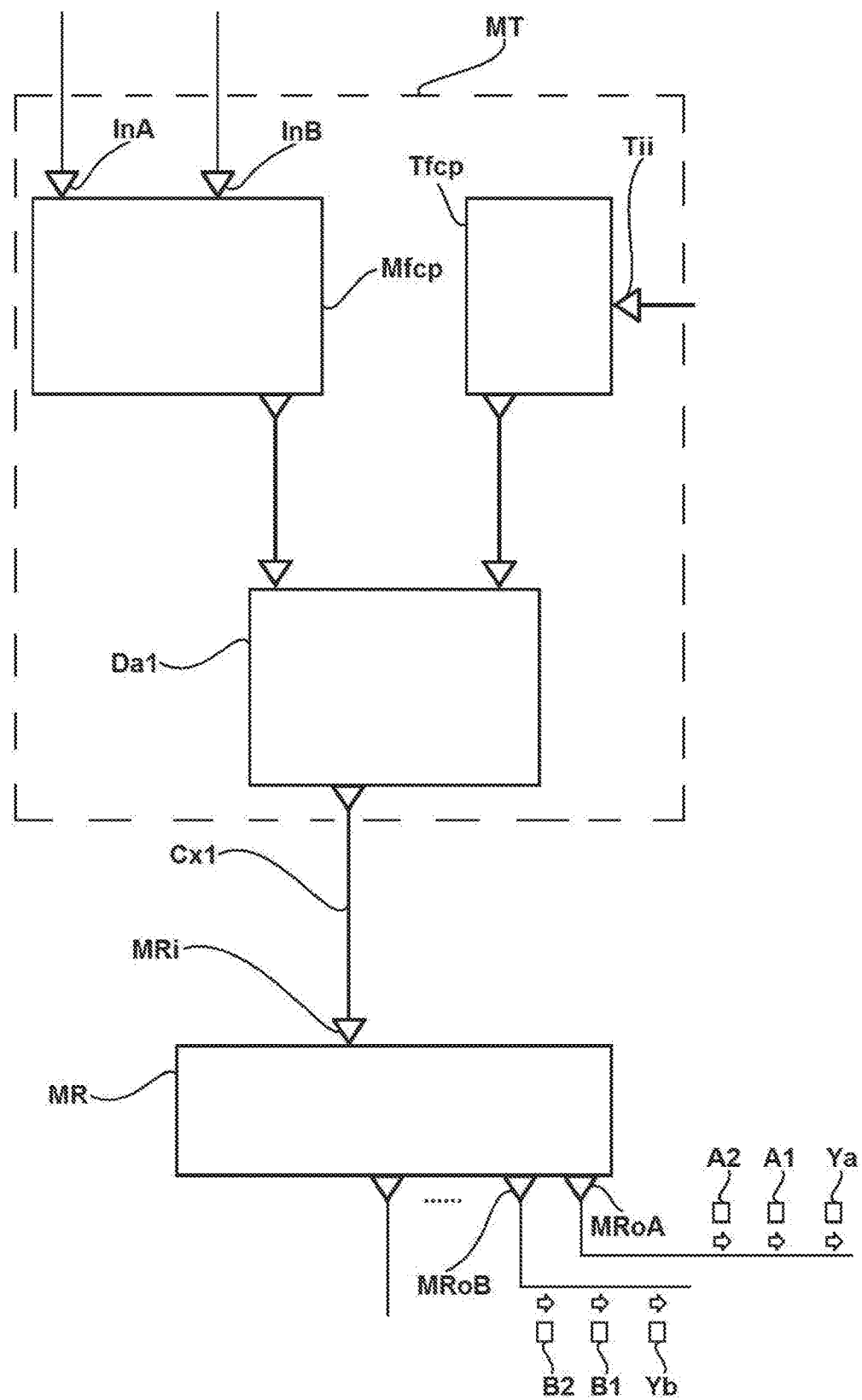
FIG. 4 is a section from FIG. 1, namely a part of the embodiment of the test device TE1 shown in FIG. 1, wherein a data transmission is illustrated schematically in a third time interval, which succeeds the second time interval.

FIG. 2 or FIG. 3 dissect the sequence described in the last paragraph to the first time interval or to the second time interval.

The part illustrated in FIG. 3 of the embodiment of the test device TE1 shown in FIG. 1 more closely highlights a data transmission by way of an example, wherein in a third time interval that follows the second time interval it is schematically shown that the measured data A1, A2 derived from a first measured data input InA and the measured data B1, B2 derived from a second measured data input InB is respectively forwarded as a function of the corresponding measured data input to the respective measured data receiver outputs MRoA, MRoB, in such a way that on the one hand, the corresponding first task ID data packet Ya precedes the first selected measured data A1, A2, if a first sub-data stream, comprising the first task ID data packet Ya and the first selected measured data A1, A2, is output to a first measured data receiver output MRoA, and on the other hand, the corresponding second task ID data packet Yb precedes the second selected measured data B1, B2 when a second sub-data stream comprising the second task ID data packet Yb and the second selected measured data B1, B2, is output to a second measured data receiver output MRoB. If, as shown in FIG. 1, the first measured data receiver output MRoA is connected to a first input of the computer unit, and the second measured data receiver output MRoB is connected to a second input of the computer unit, the first sub-data stream is forwarded to the first input of the computer unit, and the second sub-data stream is forwarded to the second input of the computer unit.

Advantageously, the computer unit Cn1 is provided with information about the measured data A1, A2, B1, B2 that is mapped to an [M]th task by means of the task ID data packets Ya, Yb.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for transmitting metrologically acquired and digitized measured data in a test device, wherein the measured data corresponds to an [M]th program task of an executable program code, the method comprising:
   providing a direction of the transmission of the measured data from a measured data transmitter of the test device via a data channel to a measured data receiver of the test device;
   providing the measured data transmitter with a signal preprocessing processor, a task monitoring processor, and a data channel arbiter;
   embedding, via the signal preprocessing processor, the measured data applied at its measured data input in a predefined data packet format and subsequently transmitting such to the data channel arbiter;
   generating, via the task monitoring processor, a task ID data packet at an execution start of the [M]th program task or at an execution end of the [M]th program task;
   transmitting the task ID data packet to the data channel arbiter; and
   forwarding sequentially the measured data and the task ID data packet via the data channel arbiter via the data channel as a data stream to the measured data receiver such that from the measured data receiver, a mapping of the measured data with the [M]th program task is determined in that the task ID data packet is identified by the measured data receiver.

2. The method according to claim 1, wherein the executable program code is executed on a computer unit included in the test device to further process the measured data after forwarding the measured data from the measured data transmitter via the measured data receiver to the computer unit.

3. The method according to claim 1, wherein, via the task monitoring processor, the task ID data packet is generated substantially simultaneously with an execution start of the [M]th program task or substantially concurrently with an execution end of the [M]th program task, and the task ID data packet is transmitted to the data channel arbiter.

4. The method according to claim 2, wherein from the computer unit, in real time in a first case, an execution start signal is generated, with which the execution start of the [M]th program task is detected, wherein the execution start signal is transmitted to a task monitoring processor input of the task monitoring processor or in a second case, an execution end signal is generated, with which the execution end of the [M]th program task is detected, wherein the execution end signal is transmitted to a task monitoring processor input of the task monitoring processor.

5. The method according to claim 1, wherein, via the task monitoring processor, the task ID data packet is generated substantially simultaneously at the execution start of the [M]th program task, and a further execution of the measured data is carried out on the processing unit in an [M+1]st program task, directly temporally subsequent to the [M]th program task.

6. The method according to claim 1, wherein the further processing of the measured data is carried out in an [M+N]th program task temporally subsequent to the [M]th program task, and wherein N is an integer and a positive number with a value greater than one.

7. The method according to claim 2, wherein the measured data is transmitted from a measured data receiver output of the measured data receiver to the computer unit, and subsequently, actuator control data is output to an actuator from the computer unit via the program code processing the measured data.

8. The method according to claim 1, wherein, via the data channel arbiter, a forwarding of the task ID data packet to the measured data receiver is given priority or given the highest possible priority with respect to the forwarding.

9. The method according to claim 1, wherein, within an execution duration of the [M]th program task, either: the measured data and subsequently the task ID data packet are transmitted via the data channel to the measured data receiver by the data channel arbiter or the task ID data packet and subsequently the measured data are transmitted via the data channel to the measured data receiver by the data channel arbiter.

10. The method according to claim 1, wherein an origination information, which identifies whether the measured data was sampled by a first sensor or by a second sensor is entered for the measured data, provided that the latter is integrated into the predefined data packet format, in a metadata area which corresponds to the data packet format of a measured data packet which comprises the measured data, and wherein the measured data receiver has at least two measured data receiver outputs, namely a first measured data receiver output and a second measured data receiver output, and wherein the origination information for an origin-dependent forwarding of the measured data within the measured data receiver is provided such that measured data sampled by the first sensor is output at the first measured data receiver output and such that measured data sampled by the second sensor is output at the second measured data receiver output, and wherein numerically, for each measured data input read out within an execution duration of the [M]th program task in each case at least one task ID data packet is generated, and wherein within the execution duration of the [M]th program task, at least one task ID data packet is output at the first measured data receiver output and at least one task ID data packet is output at the second measured data receiver output.

11. The method according to claim 1, wherein the method is carried out in a test device for performing a HIL simulation or in an RCP test device.

12. A test device for executing a program code and for transmitting digitized measured data, the test device comprising:
- a measured data receiver; and
- a measured data transmitter comprising a signal preprocessing processor, a task monitoring processor, and a data channel arbiter,
- wherein the measured data corresponds to an [M]th program task of an executable program code,
- wherein a direction of the transmission of the measured data from the measured data transmitter of the test device is provided via a data channel to the measured data receiver of the test device,
- wherein the signal preprocessing processor is configured to integrate the measured data applied to a measured data input into a predefined data packet format and to subsequently transmit such to the data channel arbiter,
- wherein the task monitoring processor is adapted to generate a task ID data packet at an execution start of the [M]th program task or at an execution end of the [M]th program task, and to transmit the task ID data packet to the data channel arbiter, and
- wherein the data channel arbiter is configured to forward the measured data and the task ID data packet in succession via the data channel as a data stream to the measured data receiver such that the measured data receiver determines a mapping of the measured data with the [M]th program task by identifying the task ID data packet.

13. The test device according to claim 12, wherein the test device is provided and configured to carry out a method comprising:

providing a direction of the transmission of the measured data from a measured data transmitter of the test device via a data channel to a measured data receiver of the test device;

providing the measured data transmitter with a signal preprocessing processor, a task monitoring processor, and a data channel arbiter;

embedding, via the signal preprocessing processor, the measured data applied at its measured data input in a predefined data packet format and subsequently transmitting such to the data channel arbiter;

generating, via the task monitoring processor, a task ID data packet at an execution start of the [M]th program task or at an execution end of the [M]th program task;

transmitting the task ID data packet to the data channel arbiter; and forwarding sequentially the measured data and the task ID data packet via the data channel arbiter via the data channel as a data stream to the measured data receiver such that from the measured data receiver, a mapping of the measured data with the [M]th program task is determined in that the task ID data packet is identified by the measured data receiver.

14. The test device according to claim 12, wherein a task monitoring processor input of the task monitoring processor is connected to a time synchronizer to transmit a time synchronization signal from the time synchronizer to the task monitoring processor, wherein the time synchronization signal has a predefined temporal relationship at a time of a start and/or an end of the [M]th program task, and a predefined temporal relationship at a time of a start and/or an end of an [M+N]th program task, and wherein N is an integer and N is equal to or greater than 1.

15. The test device according to claim 12, wherein a task monitoring processor input of the task monitoring processor is connected to a trigger selector, and wherein the trigger selector is adapted for optionally producing a signal transmission channel for the provision of a task ID data packet that is synchronized with the [M]th program task, either to the computer unit or to a time synchronizer or to an electronic angle synchronizer or to a trigger influencer.

* * * * *